(12) United States Patent
Peddie et al.

(10) Patent No.: US 8,848,878 B2
(45) Date of Patent: Sep. 30, 2014

(54) SYSTEMS AND METHODS FOR FACILITATING EMERGENCY CALLBACKS

(75) Inventors: Timm Peddie, Sandy Springs, GA (US); Michael Poffenberger, Sandy Springs, GA (US)

(73) Assignee: Cox Communications, Inc., Atlanta, GA (US)

( * ) Notice: Subject to any disclaimer, the term of this patent is extended or adjusted under 35 U.S.C. 154(b) by 1017 days.

(21) Appl. No.: 12/894,873

(22) Filed: Sep. 30, 2010

(65) Prior Publication Data

US 2012/0082302 A1 Apr. 5, 2012

(51) Int. Cl.
*H04M 11/04* (2006.01)
*H04M 3/42* (2006.01)
*H04M 3/51* (2006.01)

(52) U.S. Cl.
CPC ........ *H04M 3/42195* (2013.01); *H04M 3/5116* (2013.01); *H04M 11/04* (2013.01)
USPC ....................................... 379/46; 379/210.01

(58) Field of Classification Search
USPC ......................................... 379/45–46, 210.01
See application file for complete search history.

(56) References Cited

U.S. PATENT DOCUMENTS

| | | | |
|---|---|---|---|
| 5,467,388 A | 11/1995 | Redd, Jr. et al. | |
| 6,167,128 A * | 12/2000 | Fuller et al. | 379/211.01 |
| 7,190,947 B2 | 3/2007 | Binzel et al. | |
| 7,437,142 B2 | 10/2008 | Hurtta | |
| 7,627,307 B2 * | 12/2009 | Droste et al. | 455/404.1 |
| 7,643,625 B2 * | 1/2010 | Pearson | 379/201.01 |
| 8,244,204 B1 * | 8/2012 | Chen et al. | 455/404.1 |
| 8,295,802 B2 * | 10/2012 | Nagoya | 455/404.1 |
| 8,423,067 B2 * | 4/2013 | Schmitt | 455/512 |
| 2005/0286701 A1 | 12/2005 | Suvanne et al. | 379/207.11 |
| 2008/0063153 A1 * | 3/2008 | Krivorot et al. | 379/45 |
| 2011/0159839 A1 * | 6/2011 | Mcewen et al. | 455/404.1 |

* cited by examiner

*Primary Examiner* — Joseph T Phan
(74) *Attorney, Agent, or Firm* — Sutherland Asbill & Brennan LLP (57) ABSTRACT

Systems and methods for facilitating emergency callbacks are provided. A request to permit the connection of a telephone call originated by a user device may be received by a call processing system. The call processing system may include any number of computers or computing devices. The telephone call may be identified by the call processing system as an emergency call. Based upon the identification, the call processing system may override one or more incoming call parameters to permit connection of a return call to the user device.

11 Claims, 4 Drawing Sheets

SYSTEMS AND METHODS FOR FACILITATING EMERGENCY CALLBACKS

FIELD OF THE INVENTION

Aspects of the invention relate generally to emergency call services, and more particularly, to facilitating emergency callbacks or return calls made by emergency service centers.

BACKGROUND OF THE INVENTION

Telephone systems, such as public-switched telephone systems and cellular systems, are typically mandated to provide emergency calling service support, such as an emergency 9-1-1 service. In calling systems that utilize account privileges or account permissions, a customer, user, or administrator may restrict a set of telephone numbers that may be dialed and/or received. In the event of an outbound emergency call, the calling system will typically permit the emergency call to be made. However, the established privileges or permissions will typically prevent an emergency return call made by an emergency system to a user device from being connected. For example, if a user-initiated emergency call is disconnected, then an emergency callback initiated by an emergency operator will typically be rejected based upon the established privileges or permissions. A dial-from number for the emergency operator is often unknown and not publicly available. Thus, the dial-from number is typically not included in an approved calling list, thereby resulting in a rejection of the call based upon the established privileges or permissions. Accordingly, improved systems and methods for facilitating emergency callbacks or return calls are desirable.

BRIEF DESCRIPTION OF THE INVENTION

Some or all of the above needs and/or problems may be addressed by certain embodiments of the invention. Embodiments of the invention may include systems and methods for facilitating emergency callbacks. In one embodiment, a method that facilitates an emergency callback may be provided. A request may be received by a call processing system to permit the connection of a telephone call originated by a user device. The call processing system may include any number of computers or computing devices. The telephone call may be identified by the call processing system as an emergency call. Based upon the identification, the call processing system may override one or more incoming call parameters to permit connection of a return call to the user device.

In accordance with another embodiment of the invention, a system for facilitating an emergency callback may be provided. The system may include at least one communications interface and at least one processor. The at least one communications interface may be configured to receive a request to permit the connection of a telephone call originated by a user device. The at least one processor may be configured to (i) identify the telephone call as an emergency call and (ii) override, based upon the identification, one or more incoming call parameters to permit connection of a return call to the user device.

In accordance with yet another embodiment of the invention, a method for facilitating an emergency callback may be provided. Based upon the processing of a request to permit the connection of an emergency telephone call, one or more permission parameters for a user may be overridden by a call processing system that includes any number of computers or computing devices. The one or more permission parameters may be associated with the receipt of incoming calls made to the user. A request to permit the connection of a return emergency call may be received by the call processing system. Based upon an analysis of the overridden one or more permission parameters, connection of the return emergency call may be permitted by the call processing system.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems and methods for facilitating emergency callbacks or return calls in an emergency calling environment. An emergency callback or return call may be a call that is initiated by an emergency system or an emergency system operator in an attempt to establish a connection with a user that previously initiated an emergency call. For example, if a user-initiated emergency call is disconnected, then an emergency operator may attempt to reestablish contact with the user by initiating an emergency callback.

In certain embodiments, a call processing system, such as a policy control system, may be provided. The call processing system may be configured to evaluate call requests associated with one or more user devices (e.g., telephones, mobile telephones, Voice over Internet Protocol telephones, etc.), such as call requests for outbound calls made by the user devices and/or call requests for inbound calls made to the user devices. During the evaluation of a call request, the call processing system may analyze any number of permissions and/or privilege parameters associated with a user device and/or user account. For example, the call processing system may analyze a set or list of numbers to which calls may be placed and/or from which calls may be received. Based upon the evaluation of a call request, the call processing system may determine whether a requested call may be connected or whether a connection of the call is permitted.

According to an aspect of the invention, the call processing system may receive a request to permit the connection of an outbound emergency call originating from a user device, such as an emergency 9-1-1 ("E911") call. The call processing system may identify the call as an emergency call and permit the call to be connected. Additionally, the call processing system may override one or more incoming call permissions or incoming call parameters based upon the identification and/or connection of the emergency call. In this regard, a return call or callback made by emergency personnel or an emergency system to the user device may be permitted or allowed to be connected.

A wide variety of suitable techniques or methods may be utilized as desired to override or modify incoming call permissions. For example, in certain embodiments, a stored user profile associated with the user device may be accessed, and at least a portion of the user profile information may be overridden to permit incoming calls. Additionally, a wide variety of overrides or modifications may be made to the incoming call permissions as desired in various embodiments of the invention. As one example, the incoming call permissions may be overridden to permit one or more incoming calls for a predetermined period of time (e.g., ten minutes, fifteen minutes, thirty minutes, etc.). As another example, the incoming call permissions may be overridden to permit a predetermined number of incoming calls (e.g., two incoming calls, three incoming calls, etc.). As yet another example, the incoming call permissions may be overridden to permit one or more incoming calls having a dial-from number including digits (e.g., a first six digits) that match predetermined digits. As yet another example, the incoming call permissions may be overridden to permit incoming calls originating from an identified or determined geographical area or location. Additionally, as desired, any combination of the example overrides may be utilized. For example, the incoming call permissions may be overridden to permit incoming calls for a predetermined period of time (e.g., ten minutes) and, following the expiration of the predetermined period of time, a predetermined number of incoming calls may be permitted.

System Overview

An example system 100 for facilitating emergency callback will now be described illustratively with respect to FIG. 1. The system 100 may include, for example, a policy control system 105 or other call processing system, a call router or switch 110, a user device 115 and/or an emergency system 120. Any number of suitable networks 125, 130 may facilitate communication between various components of the system 100. Additionally, as desired, one or more components of the system 100 may be processor-driven components or devices.

In operation, a user may utilize a user device 115 to originate an outbound emergency telephone call. Information associated with the call (e.g., a dial-from number associated with the user device 115, a dial-to number, etc.) may be received by a call router 110, and the call router 110 may communicate, to the policy control system 105, a request for permission to connect the call. The policy control system 105 may evaluate the request and determine whether the call may be connected, and the policy control system 105 may return a response to the call request to the call router 110. If the response indicates that the call may be connected, then the call router 110 may connect or attempt to connect the call between the user device 115 and a destination device, such as the emergency system 120. A return call originating from the emergency system and designating the user device 115 as a destination device may be evaluated and/or connected in a similar manner.

Figure 1:
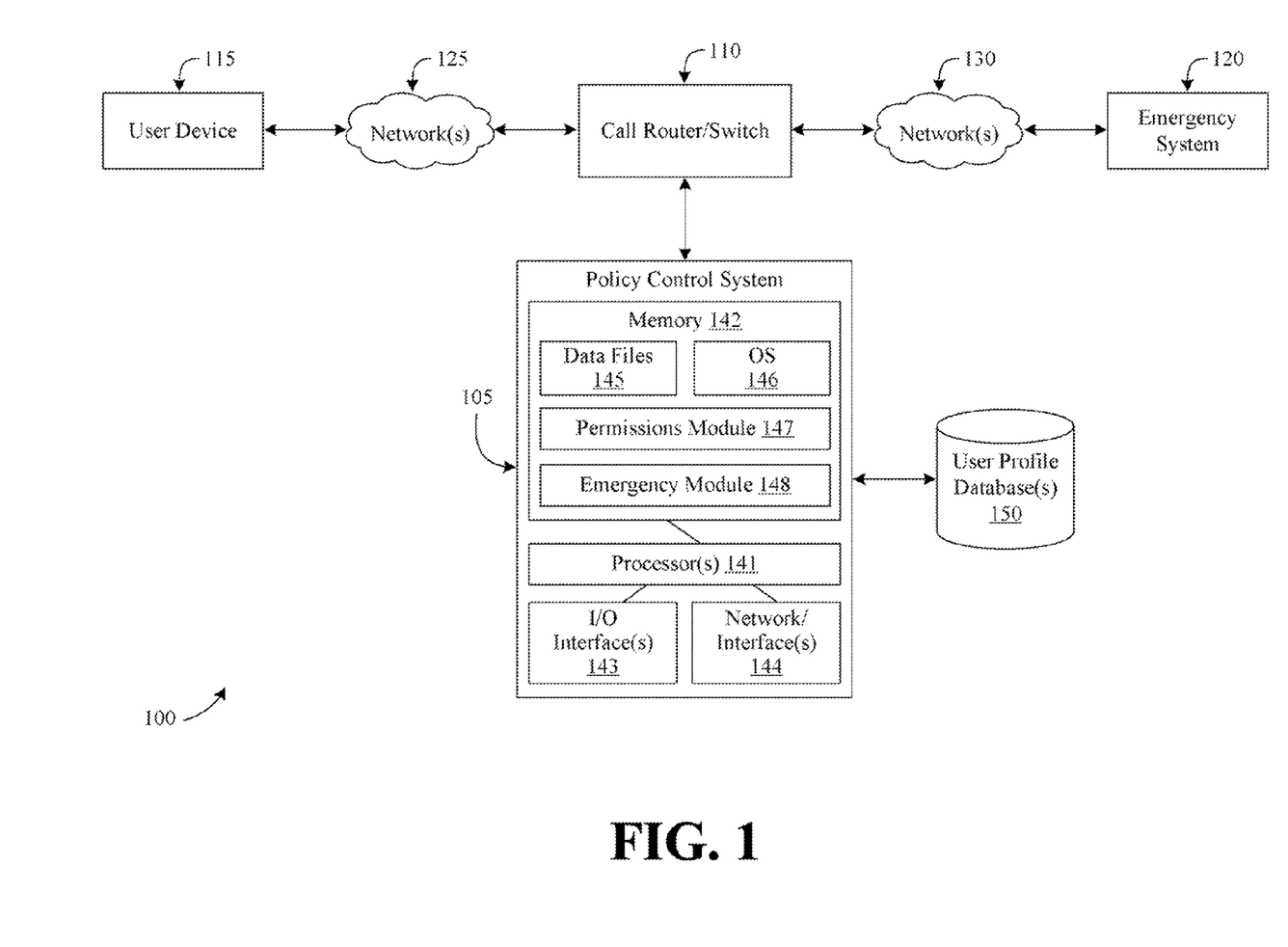
FIG. 1 illustrates a block diagram of an example system that may be utilized to facilitate the emergency callbacks, according to an illustrative embodiment of the invention.

With reference to FIG. 1, the policy control system 105 may be a suitable device, server, or other component of the system 100 that facilitates the evaluation of requests to connect telephone calls. The policy control system 105 may be associated with an underlying service provider, such as a mobile telephone service provider, Voice over Internet Protocol ("VoIP") service provider, cable service provider, satellite service provider, or other service provider. The policy control system 105 may be a suitable processor-driven device that is configured to execute computer-readable, computer-implemented, or computer-executable instructions. For example, the policy control system 105 may include one or more server computers, personal computers, digital assistants, personal digital assistants, digital tablets, Internet appliances, application-specific circuits, microcontrollers, minicomputers, or other processor-based devices. The execution of suitable computer-implemented instructions by the policy control system 105 may form a special purpose computer or other particular machine that is operable to facilitate the evaluation of call requests and/or the determination of whether call connections will be permitted. Although a single policy control system 105 is illustrated, the operations and/or control of the policy control system 105 may be distributed among any number of devices, systems, computers, and/or processing components.

In addition to having one or more processors 141, the policy control system 105 may include one or more memory devices 142, one or more input/output ("I/O") interfaces 143, and/or one or more network interfaces 144. The processor(s) 141 may be configured to execute any number of software applications and/or computer-readable or computer-executable instructions. The memory devices 142 may include any number of suitable memory devices, such as caches, read-only memory devices, random access memory devices, magnetic storage devices, etc. The memory devices 142 may store data, executable instructions, and/or various program modules utilized by the processor(s) 141. Examples of data that may be stored by the memory devices 142 include data files 145 and/or any number of suitable program modules that may be executed by the processor(s) 141, such as an operating system ("OS") 146, a permissions module 147 and/or an emergency module 148. The data files 145 may include any suitable data that facilitates the operation of the policy control system 105, the receipt of call requests, and/or the processing of call requests. For example, the data files 145 may include, but are not limited to, information that facilitates communication with any number of call routers and/or switches 110 (e.g., cellular switches, public-switched telephone systems, etc.), information that facilitates identification of user devices 115, information associated with user devices 115, user profile information, user account information, and/or call permission information.

The OS 146 may be a suitable software module that controls the general operation of the policy control system 105. The OS 146 may also facilitate the execution of other software modules, for example, the permissions module 147 and/or the emergency module 148. As desired, the policy control system 105 may additionally include one or more host modules that facilitate the establishment of a communications session with one or more call routers 110 via any number of suitable networks.

The permissions module 147 may be a suitable software module or software application that is configured to receive and process call requests or call connection requests. In operation, the permissions module 147 may receive a call request from a call router 110 or switch, such as a cellular switch or other telephone switch. The request may be received using any number of suitable networks and/or dedicated communications lines, such as a cellular network, a public-switched telephone network, a wide area network, the Internet, a land line, other wired and/or wireless networks, etc.

Once a call request has been received, the permissions module 147 may identify one or more parameters and/or other information associated with the call. For example, the permissions module 147 may determine an identifier associated with a device from which the call originated (e.g., a dial-from number, a user device identifier, etc.) and/or an identifier associated with a destination device (e.g., a dial-to number, a user device identifier, etc.). A user device 115 associated with the call request as either an originating device or a destination device may be identified, and the permissions module 147 may identify an account or profile associated with the user device 115. For example, the permissions module 147 may identify a stored user profile associated with the user device 115, and the user profile may be accessed from memory 142 and/or any number of suitable databases, such as the user profile databases 150 illustrated in FIG. 1. The accessed information may include a wide variety of information associated with a user, user device 115, and/or user account. According to an aspect of the invention, the accessed information may include permissions and/or privileges information associated with the connection of calls to and/or from the user device 115. The permissions and/or privileges information may include a wide variety of different information, such as a list or set of approved telephone numbers and/or groups of telephone numbers (e.g., telephone numbers including a predetermined number of approved digits) to which telephone calls may be made, a list or set of approved telephone numbers and/or groups of telephone numbers from which telephone calls may be received, a list or set of blacklisted telephone numbers and/or groups of numbers to which telephone calls may not be made and/or from which telephone calls cannot be received, and/or parameters associated with the processing of outgoing and/or incoming call requests.

Based upon the accessed or identified permissions and/or privileges information, the permissions module 147 may evaluate the received call request and determine whether the call is permitted to be connected. For example, the permissions module 147 may determine whether a number dialed by a user device 115 is included in a list of approved numbers to which calls may be made. As another example, the permissions module 147 may determine whether a number from which an incoming call originated is included in list of approved numbers from which calls may be received by the user device 115. Based upon the evaluation and/or determination, the permissions module 147 may generate a response to the call request. The response may indicate whether the requested call is permitted to be connected or whether permission to connect the requested call is denied. Once the response has been generated, the permissions module 147 may direct the communication of the response to the call router 110 from which the call request was received. Based upon the received response, the call router 110 may determine whether or not to connect the requested call.

According to an aspect of the invention, the permissions module 147 may be configured to identify an outbound emergency call originating from a user device 115. For example, the permissions module 147 may identify a dialed number, such as "911", as an emergency number. As another example, the permissions module 147 may identify an emergency code or emergency tag included in the received information associated with the requested call. If a call is identified by the permissions module 147 as an emergency call, then the permissions module 147 may determine that the call is permitted to be connected, and the permissions module 147 may direct the call router 110 to connect the call. Additionally, as desired, the permissions module 147 may direct the call router 110 to communicate information associated with the user and/or user device 115 to the destination device for the call. For example, the permissions module 147 may direct the call router 110 to communicate a telephone number associated with the user device 115, caller identification information, Global Positioning System ("GPS") coordinates, and/or other location information to the destination device. Additionally, the call permissions module 147 may invoke or direct the emergency module 148 to facilitate the overriding of incoming call permissions associated with the user device 115. In this regard, callbacks originating from an emergency system 120 may be facilitated.

The emergency module 148 may be a suitable software module or software application that is configured to process emergency call requests and/or to override incoming call permissions based at least in part upon the identification of an emergency call request. In certain embodiments, the emergency module 148 may be incorporated into the permissions module 147. In operation, the emergency module 148 may receive an indication or determination that an emergency call has been requested by a user device 115. Based at least in part upon the received indication, the emergency module 148 may be configured to override incoming call permissions associated with the user device 115. For example, the emergency module 148 may be configured to temporarily override incoming call permissions associated with a user telephone number or user account. In this regard, callbacks or return calls originating from the emergency system in response to an emergency call and/or in response to a disconnection of the emergency call may be permitted and/or facilitated.

A wide variety of suitable methods and/or techniques may be utilized as desired to override incoming call permissions. For example, time-based overrides, number of call overrides, permitted telephone number-based overrides, and/or location-based overrides may be made. As an example of a time-based override, the incoming call permissions for a user account or telephone number may be overridden to permit incoming calls for a predetermined period of time, such as ten minutes, fifteen minutes, or thirty minutes following the identification of the outbound emergency call. In certain embodiments, the predetermined period of time may be determined or established by the policy control system 105. In other embodiments, the predetermined period of time may be established by a user or customer associated with the user account.

As another example override, the incoming call permissions may be overridden to permit a predetermined number of incoming calls. For example, following the identification of an outbound emergency call, the incoming call permissions may be overridden to permit connection of the next one, two, three, or some other predetermined number of calls. Similar to the time-based override described above, the predetermined number may be determined by the policy control system 105 or by a user or customer.

As yet another example override, the incoming call permissions may be overridden to permit incoming calls originating from one or more telephone numbers that satisfy one or more predetermined criteria, such as a telephone number including a plurality of digits that match a predetermined number of digits. As one example, when an outbound emergency call is identified, one or more number plan area codes ("NPA" codes) and/or central office exchange codes ("NXX" codes) from which emergency return calls are expected may be identified. For example, an NPA-NXX number (i.e., the first six digits of a telephone number) associated with the user device 115 and/or location information (e.g., GPS coordinates) associated with the user device 115 may be utilized to identify one or more NPA-NXX numbers that are expected to be associated with emergency systems from which callbacks may originate. The incoming call permissions may be overridden to permit incoming calls originating from a telephone number that includes an NPA-NXX number that matches one of the identified one or more numbers.

As yet another example override, the incoming call permissions may be overridden to permit incoming calls having location information or geographical information that corresponds to location information for the user device 115 from which an outbound emergency call originated. For example, when an outbound emergency call is originated by a user device 115, location information associated with the user device 115 may be identified. In certain embodiments, such as embodiments in which the user device 115 is a public-switched telephone, the location information may include an address or other location for the user, such as an address that is accessed from a user profile. In other embodiments, such as embodiments in which the user device 115 is a mobile device, the location information may include GPS coordinates or other location information that is received from the user device 115 either along with the call connection request or in response to a request for location information communicated to the user device.

Once location information for the user device 115 is identified, the location information may be utilized to override incoming call permissions. As one example, location information may be utilized to determine one or more geographical areas and/or telephone calling areas (e.g., NPA code, NPA-NXX codes, etc.) from which emergency callbacks are expected, and call permissions may be overridden to permit incoming calls that satisfy the determined geographical areas and/or telephone calling areas. As another example, location information may be stored and compared to location information received in association with an incoming call request, such as a request to connect an emergency callback. The incoming call may be permitted if the location information for the incoming call (e.g., an address, a calling area, an NPA code, an NPA-NXX code, a ZIP code, GPS coordinates, etc.) matches, corresponds to, or is situated within a predetermined distance (e.g., ten miles, twenty miles, etc.) to the location information for the user device 115. As yet another example, location information for the user device 115 may be utilized to access stored information associated with emergency systems, and emergency systems from which emergency callbacks are expected to originate may be identified. Call permissions may then be overridden to permit incoming calls originating from the identified emergency systems.

As desired, multiple techniques may be utilized to override incoming call permissions. For example, incoming call permissions may be overridden to permit incoming calls for a predetermined period of time (e.g., ten minutes, fifteen minutes, etc.) and to permit a predetermined number of calls following expiration of the predetermined period of time. As another example, incoming call permissions may be overridden to permit, for a predetermined period of time, incoming calls originating from a telephone number satisfying a predetermined NPA-NXX criteria. Other override techniques and/ or combinations of override techniques will be readily apparent to those of ordinary skill in the art. The techniques set forth above are provided by way of example only and should not be construed as limiting.

One example of the operations that may be performed by the permissions module 147 and/or the emergency module 148 to facilitate emergency callbacks is described in greater detail below with reference to FIGS. 3 and 4.

The one or more I/O interfaces 143 may facilitate communication between the policy control system 105 and one or more input/output devices, for example, one or more user interface devices, such as a display, keypad, mouse, pointing device, control panel, touch screen display, remote control, microphone, speaker, etc., that facilitate user interaction with the policy control system 105. In this regard, user commands may be received by the policy control system 105.

The one or more network interfaces 144 may facilitate connection of the policy control system 105 to one or more suitable networks, for example, one or more suitable networks that facilitate communications with call routers 110. In this regard, the policy control system 105 may receive call requests and/or communicate responses to call requests. Additionally, as desired, the policy control system 105 may communicate information to any number of other components of the system 100, such as one or more user devices 115 and/or emergency systems 120.

With continued reference to FIG. 1, any number of user devices 115 may be provided. A user device 115 may be a device utilized by a user to request outbound telephone calls and/or to receive incoming telephone calls. Examples of suitable user devices 115 include, but are not limited to, mobile telephones, cellular devices, public-switched telephones, VoIP telephones, set-top boxes and/or other customer premise equipment that may be utilized to connect telephone calls, computers and/or other Web-based devices, etc.

In operation, a user may utilize a user device 115 to request the connection of an outbound emergency call. The call connection request may be communicated from the user device 115 to a call router 110 or switch that is configured to connect the call. Prior to a connection, the call router 110 and/or the policy control system 105 may process the call in order to determine whether the call is permitted to be connected. In a similar manner, inbound calls may be connected to a user device 115. In certain embodiments, the user device 115 may be configured to communicate user device identifying information (e.g., a telephone number associated with the user device 115, a user name associated with the device 115, etc.), location information (e.g., GPS coordinates), and/or other information in association with a call request. In addition to requesting outbound calls, a user may utilize the user device 115 to receive incoming calls that are connected by the call router 110.

Similar to the user devices 115, any number of emergency systems 120 or public safety answering points ("PSAP") may be provided and/or utilized as desired in various embodiments of the invention. An emergency system 120 may operate in a similar manner as a user device 115. For example, an emergency system 120 may include any number of telephone devices that are configured to receive and/or process emergency calls. As desired, an emergency system 120 may include any number of suitable computing devices that facilitate the processing of emergency calls and/or the dispatch of emergency personnel. During the receipt of an emergency call, the emergency system 120 may receive caller location information (e.g., an address, GPS coordinates, etc.) and/or caller identification information (e.g., a user telephone number, etc.), and the emergency system 120 may utilize the received information to dispatch emergency personnel. Additionally, the emergency system 120 may utilize the received information to facilitate a callback or return call to a user device 115 in the event of a disconnected emergency call or as a follow-up to an emergency call. During a callback, the emergency system 120 may communicate a call connection request to a call router 110, and the call connection request may be processed by the call router and/or the policy control system 105.

With continued reference to FIG. 1, any number of call routers 110 and/or switches may be provided as desired in various embodiments of the invention. A call router 110 may be a suitable telephone exchange, telephone switch, cellular switch, or other system that facilitates the connection of telephone calls. In operation, a connection request may be received by a call router 110. The call router 110 may identify a requesting or originating device for the call and a destination device for the call. For example, the call router 110 may identify a dialed-from number and a dialed-to number associated with the call request. In certain embodiments, the call router 110 may identify at least one of the devices as a device associated with call permissions data. For example, the call router 110 may identify a telephone number as a telephone number associated with call permissions data. Based upon the identification, the call router 110 may communicate a request to connect the call to the policy control system 105. The policy control system 105 may process the request and return a response to the call router 110. Based at least in part upon a response received from the policy control system 105, the call router 110 may connect the call or deny the call connection.

During the processing of an emergency call, the call router 110 may additionally be configured to identify caller identification information and/or location information associated with a user device 115 that originated the emergency call. The call router 110 may communicate at least a portion of the identified information to a recipient of the emergency telephone call. In this regard, an emergency system 120 may be provided with information that facilitates a callback or return call.

As desired in certain embodiments, a plurality of call routers 110 and/or switches may be utilized to facilitate the connection of a telephone call. For example, a telephone call between a mobile device and a public-switched device may be processed by both a cellular and a public-switched telephone system. As another example, a VoIP telephone call may be processed by a suitable Internet router (e.g., an Ethernet router) and by one or more telephone switching and/or cellular switching systems. Indeed, any number of intermediary systems and/or switches may be utilized to facilitate the connection of a telephone call in accordance with various embodiments of the invention.

Communications between various components of the system 100 may be facilitated via any number of suitable networks, such as public-switched telephone networks, cellular networks, cable networks, satellite networks, dedicated communication lines, the Internet, and/or other wired and/or wireless networks. With reference to FIG. 1, a first network 125 and/or combination of networks may facilitate communications between the user device 115 and the call router 110. Additionally, a second network 130 and/or combination of networks may facilitate communications between the call router 110 and the emergency system 120. Although different networks 125, 130 are illustrated, the networks 125, 130 may be combined into a single network as desired.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

Operational Overview

Figure 2:
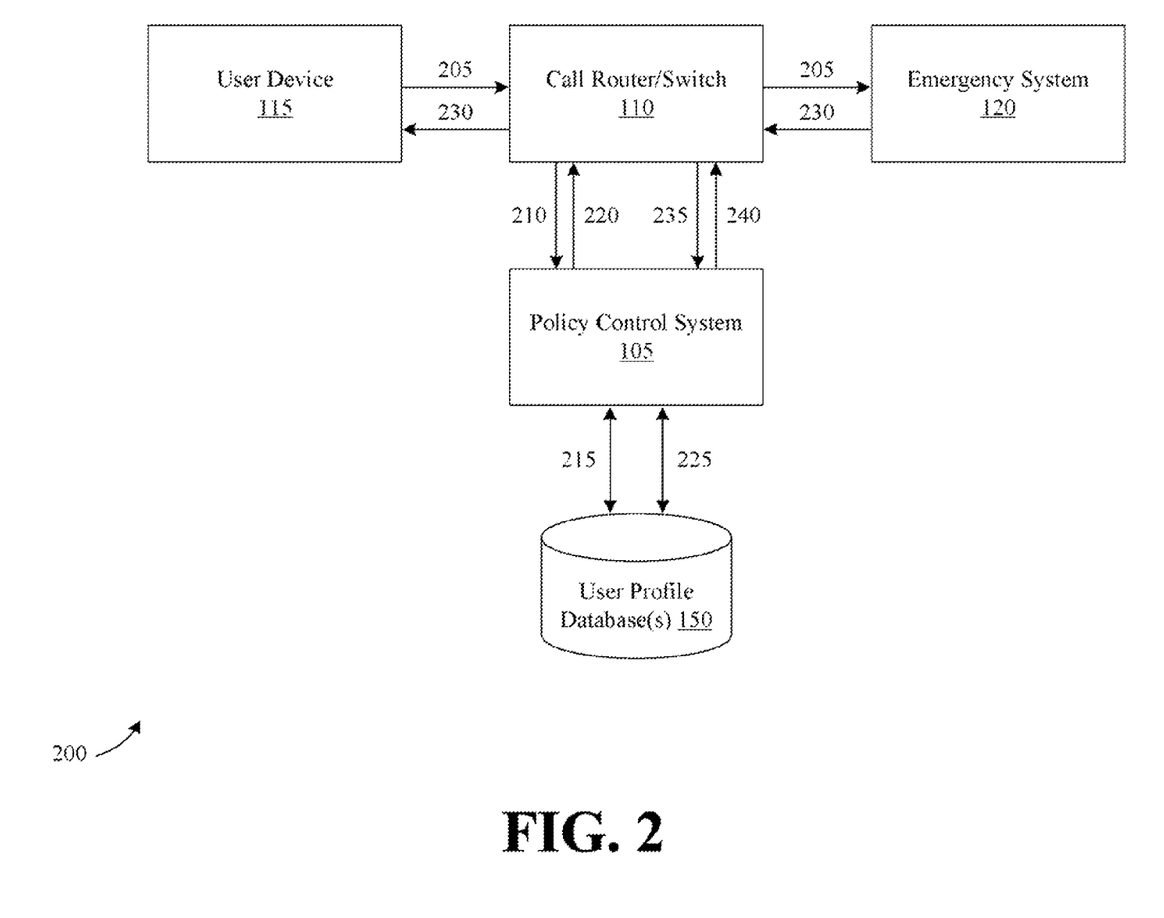
FIG. 2 illustrates a diagram of an example data flow for processing emergency calls and emergency callbacks, according to an illustrative embodiment of the invention.

FIG. 2 illustrates a diagram of an example data flow 200 for processing emergency calls and emergency callbacks within a calling system, such as the system 100 illustrated in FIG. 1. With reference to FIG. 1, a user may utilize a user device, such as the user device 115 illustrated in FIG. 1, to dial an emergency number. For example, the user may input "9-1-1" into the user device 115 and request the connection of an emergency call. An emergency call 205, emergency call instruction, or emergency call request may be generated by the user device 115 and communicated to a call router or switch, such as the call router 110 illustrated in FIG. 1. As desired in various embodiments of the invention, a wide variety of information may be included in the emergency call 205, such as an identifier of the user device 115 (e.g., a dialed-from telephone number), caller identification information associated with the user device 115 and/or user, location information (e.g., GPS coordinates) associated with the user device 115, and/or a dialed telephone number associated with the destination device or requested destination.

The emergency call 205 may be received by the call router 110 and processed by the call router 110. According to an aspect of the invention, the call router 110 may identify the user device 115 as a user device that has associated call permissions data. For example, the call router 110 may evaluate an identifier of the user device 115, such as a telephone number associated with the user device 115. Based at least in part on the evaluation of the device identifier, the call router 110 may determine that one or more call permissions are associated with the user device 115. Following the determination, the call router 110 may communicate a call permission request 210 to a suitable policy control system or call processing system, such as the policy control system 105 illustrated in FIG. 1. As another example, the call router 110 may be a cellular switch or other switch that routes all received calls to the policy control system 105. A wide variety of suitable networks and/or dedicated connections may be utilized to facilitate communications between the call router 110 and the policy control system 105. Similar to the emergency call 205, the call permission request 210 may include a wide variety of information, such as identification information for the user device 115, location information associated with the user device, call identification information, a dialed telephone number, etc.

The policy control system 105 may receive the call permission request 210 and process the call permission request 210. In certain embodiments, the policy control system 105 may identify the call 205 as an emergency call, and the policy control system 105 may determine that the call 205 is permitted to be routed or connected. For example, the policy control system 105 may identify and access permission information 215 associated with the user device 115 and/or dialed-from telephone number, and the policy control system 105 may determine, based at least in part upon an analysis of the access permission information 215, that the emergency call 205 is permitted to be connected. A permitted outbound call list accessed from a user profile database, such as the database 150 illustrated in FIG. 1, may specify that an emergency call, such as a "9-1-1" call is permitted to be connected. As another example, the policy control system 105 may identify the call 205 as an emergency call without accessing permission information 215 from a user profile database 150. For example, a dialed number may be identified as an emergency number, and a determination may be made that the emergency call 205 is permitted to be connected based upon the identification. Once the policy control system 105 determines that the call 205 is permitted to be connected, the policy control system 105 may generate a call approval message 220 or call approval response and communicate the call approval message 220 to the call router 110. Based upon a receipt of the call approval message 220, the call router 110 may identify a recipient of the call 205, such as a local emergency system 120, and the call router 110 may connect the call 205 or direct connection of the call.

With continued reference to FIG. 2, once the policy control system 105 has identified the call 205 as an emergency call, the policy control system 105 may access the permission information 215 associated with the user and/or user device 115 from the user profile database 150. For example, a user profile and/or incoming call permissions associated with the user may be accessed. The policy control system 105 may override the incoming call permission information for the user in order to permit incoming emergency callbacks or return calls. As explained in greater detail below with reference to FIG. 4, a wide variety of suitable techniques may be utilized to override the incoming call permission information. The overridden call permission information 225 may then be stored, for example, in the user profile database 150.

Once the emergency call 205 is connected between the user device 115 and the emergency system 120, the emergency system 120 may identify information associated with the emergency call 205, such as a dialed-from number associated with the user device 115, caller identification information, and/or location information. As desired, the information may be utilized to dispatch emergency personnel. In the event of a disconnection of the emergency call 205 or as a follow-up to the emergency call 205, the emergency system 120 may utilize at least a portion of the identified information, such as a dialed-from number, to initiate a callback 230 or return call to the user device 115. The callback 230 may be communicated by the emergency system 120 to the call router 110 and processed in a similar manner as the emergency call 205. For example, the call router 110 may identify the user device 115 to which the callback 230 is being made as a user device that has associated call permissions data. Following the determination, the call router 110 may communicate a callback permission request 235 to the policy control system 105.

The policy control system 105 may receive the callback permission request 235 and process the callback permission request 235 based upon an analysis of call permission data associated with a dialed user device. For example, the policy control system 105 may identify the user device 115 based upon a dialed-to number included in the callback permission request 235, and the policy control system 105 may access the overridden call permission information 225 associated with the user device 115. Based upon an analysis of the overridden permission information 225, the policy control system 105 may determine that the emergency callback 230 is permitted to be connected. Once the policy control system 105 determines that the callback 230 is permitted to be connected, the policy control system 105 may generate a callback approval message 240 or callback approval response and communicate the callback approval message 240 to the call router 110. Based upon a receipt of the callback approval message 240, the call router 110 may connect or direct connection of the callback 230 between the emergency system 120 and the user device 115.

A wide variety of modifications may be made to the data flow 200 illustrated in FIG. 2 as desired in various embodiments of the invention. For example, in certain embodiments, user permission information may be accessed and/or obtained by the call router 110 from the user profile database 150 or the policy control system 105 and utilized to determine whether a call may be connected. The illustrated data flow 200 is provided by way of example only.

Figure 3:
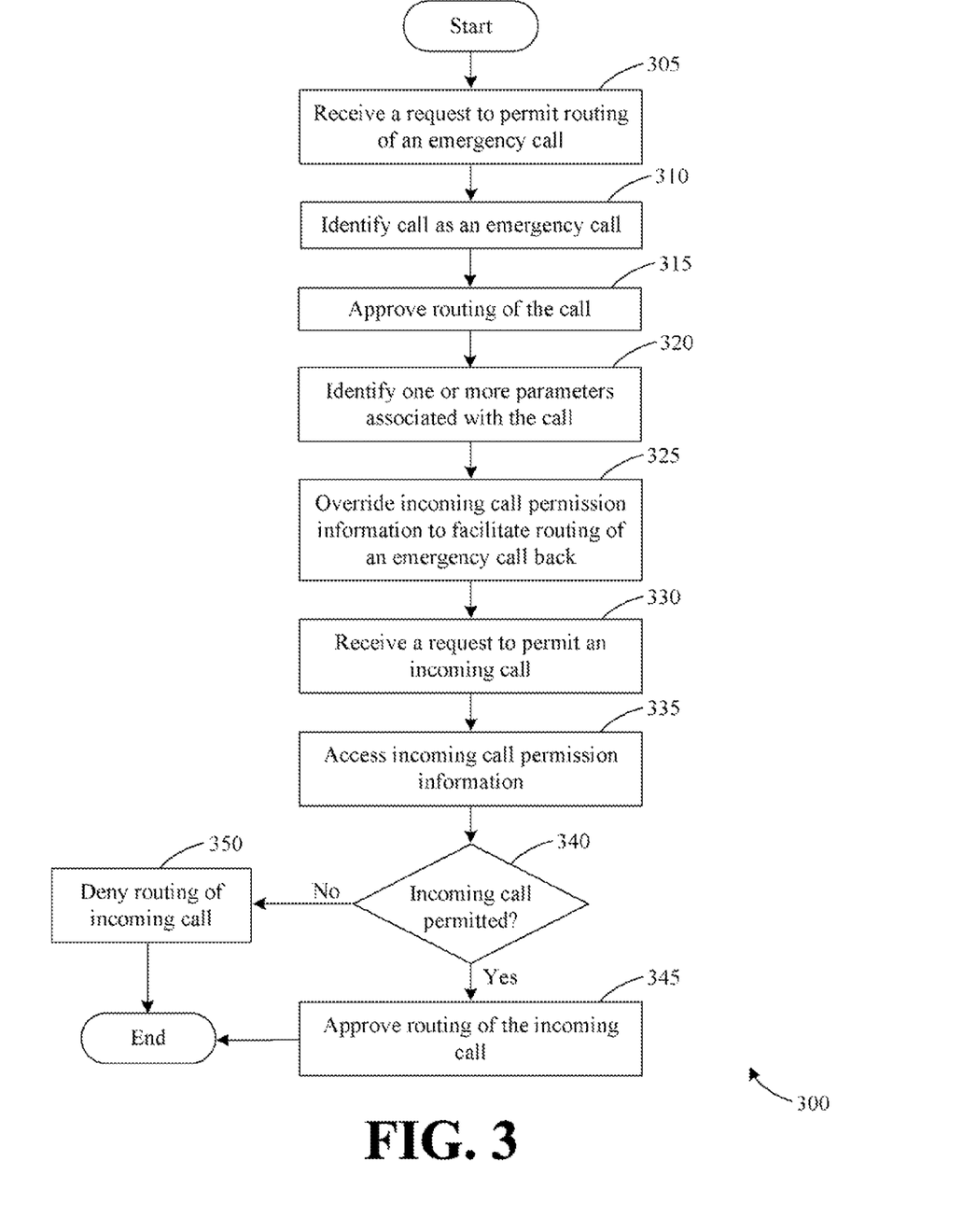
FIG. 3 is a flow diagram of an example method for processing emergency calls and emergency callbacks, according to an example embodiment of the invention.

FIG. 3 is a flow diagram of an example method 300 for processing emergency calls and emergency callbacks, according to an example embodiment of the invention. The method 300 may be performed by a suitable policy control system, such as the policy control system 105 illustrated in FIG. 1. The method 300 may begin at block 305.

At block 305, a request to permit the routing or connection of an emergency call may be received, for example, from a call router or switch. As desired, the received request may include a wide variety of information associated with the emergency call, such as a dialed number (e.g., 9-1-1, etc.), a dialed-from number, caller identification information, and/or location information associated with a user device from which the call originated. At block 310, the call may be identified as an emergency call. For example, the dialed number may be identified as an emergency number. Once the call is identified as an emergency call, the routing or connection of the call may, be approved or permitted at block 315. A response to the received request may be communicated to the call router or switch, thereby facilitating connection of the emergency call. Operations may then continue at block 320.

At block 320, one or more parameters associated with the call may be identified. For example, the dialed-from number and/or an identifier of a user device from which the call originated may be identified. Additionally, as desired, location information associated with the user device (e.g., GPS coordinates) may be identified. At least a portion of the identified parameters may be utilized to access incoming call permission information associated with the user device. For example, a user profile and/or user account information may be accessed based upon a dialed-from number and/or a device identifier. The accessed user profile may include incoming call permissions and/or parameters, such as a list of approved telephone numbers from which incoming calls may be received.

At block 325, the incoming call permissions may be overridden in order to facilitate the routing of an emergency callback or an emergency return call that is originated by an emergency system or emergency personnel. In this regard, connection of an emergency callback will not be blocked or denied by the policy control system 105. A wide variety of suitable techniques and/or combination of techniques may be utilized as desired to override the incoming call permissions, such as a time-based override technique, a number of incoming calls override technique, a telephone number-based override technique, and/or a location-based override technique. A few example override techniques are described in greater detail below with reference to FIG. 4. Once the incoming call permissions have been overridden, the overridden permissions may be stored in association with the user device and/or user profile.

At block 330, a request to permit connection of an incoming call, such as an emergency callback, may be received. For example, a request to permit an incoming call may be received from a call router or switch. Once the request is received, the user profile and/or overridden incoming call permission information may be accessed at block 335. For example, a dialed-to number included in the incoming call request may be utilized to access the user profile including the overridden incoming call permission information. At block 335, the overridden incoming call permission information may be utilized to analyze the incoming call request, and a determination may be made as to whether the incoming call is permitted. For example, a determination may be made as to whether the incoming call satisfies the overridden incoming call permissions. If it is determined at block 335 that the incoming call is permitted, then operations may continue at block 345, and the routing or connection of the incoming call may be approved. A suitable approval message or response to the incoming call request may be communicated to the call router in order to facilitate connection of the incoming call. If, however, it is determined at block 335 that the incoming call is not permitted, then operations may continue at block 350, and the routing or connection of the incoming call may be declined or denied. A suitable denial message or response to the incoming call request may be communicated to the call router in order to direct the call router not to connect or route the incoming call.

The method 300 may end following either block 345 or 350.

Figure 4:
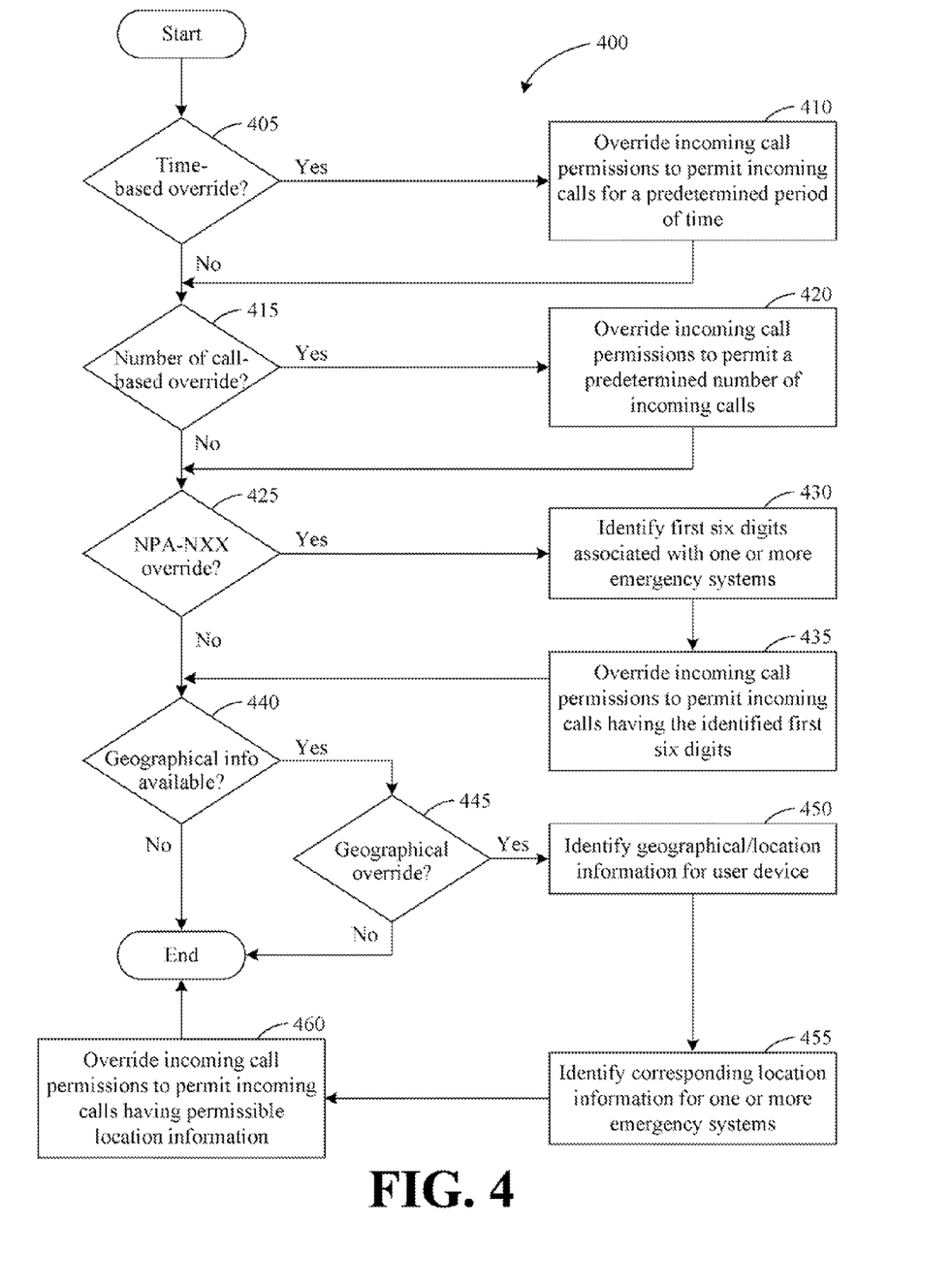
FIG. 4 is a flow diagram of an example method for overriding incoming call permissions to permit an emergency callback, according to an example embodiment of the invention.

FIG. 4 is a flow diagram of an example method 400 for overriding incoming call permissions to permit an emergency callback, according to an example embodiment of the invention. The operations illustrated in FIG. 4 are one example of the operations that may be performed at block 325 of the method 300 illustrated in FIG. 3. As such, the method 400 may be performed by a suitable policy control system and associated emergency module, such as the policy control system 105 and emergency module 148 illustrated in FIG. 1. The method 400 may facilitate the identification of override techniques to be utilized to override incoming call permissions. As desired, any number of default parameters and/or user preferences may be analyzed in order to determine the override techniques that will be utilized. The method 400 may begin at block 405.

At block 405, a determination may be made as to whether a time-based override to the incoming call permissions should be performed and/or is authorized. If it is determined at block 405 that a time-based override is not authorized or directed, then operations may continue at block 415 described below. If, however, it is determined at block 405 that a time-based override should be performed, then operations may continue at block 410. At block 410, the incoming call permissions associated with a user profile or user account may be overridden to facilitate the permission of one or more incoming calls that are received during a predetermined period of time (e.g., the next ten minutes, the next fifteen minutes, the next thirty minutes, etc.). A wide variety of predetermined time periods may be utilized as desired in various embodiments of the invention, and the length of a predetermined time period may be established by the policy control system 105, in accordance with emergency return call parameters and/or requirements, and/or in accordance with user preferences. Once the incoming call permissions have been overridden at block 410, operations may continue at block 415.

At block 415, a determination may be made as to whether a number of call-based override to the incoming call permissions should be performed and/or is authorized. If it is determined at block 415 that a number of call-based override is not authorized or directed, then operations may continue at block 425 described below. If, however, it is determined at block 415 that a number of call-based override should be performed, then operations may continue at block 420. At block 420, the incoming call permissions associated with a user profile or user account may be overridden to facilitate the permission of a predetermined number of incoming calls to the user device. (e.g., the next ten minutes, the next fifteen minutes, the next thirty minutes, etc.). A wide variety of predetermined numbers of calls (e.g., one incoming call, two incoming calls, three incoming calls, etc.) may be utilized as desired in various embodiments of the invention, and the predetermined number may be established by the policy control system 105, in accordance with emergency return call parameters and/or requirements, and/or in accordance with user preferences. Once the incoming call permissions have been overridden at block 420, operations may continue at block 425.

At block 425, a determination may be made as to whether a telephone number-based override to the incoming call permissions, such as a NPA-NXX override, should be performed and/or is authorized. If it is determined at block 425 that a telephone number-based override is not authorized or directed, then operations may continue at block 440 described below. If, however, it is determined at block 425 that a telephone number-based override should be performed, then operations may continue at block 430. At block 430, a portion of a telephone number that is associated with or likely associated with one or more emergency systems from which an emergency callback may originate may be identified or determined. For example, an NPA code (i.e., the first three digits) or NPA-NXX code (i.e., the first six digits) of a telephone number from which an emergency callback may originate may be identified or determined. A wide variety of methods may be utilized as desired to identify a portion of a telephone number. For example, a portion of a telephone number associated with the user device (e.g., an NPA-NXX code, etc.) may be utilized to identify the portion of the telephone number from which emergency callbacks may originate. As another example, location information associated with the user device may be mapped to and/or coordinated with NPA codes and/or NXX codes that are likely associated with emergency systems from which an emergency callback may originate. Once a portion of a telephone number from which emergency callbacks may originate is identified, operations may continue at block 435. At block 435, the incoming call permissions associated with the user profile or user account may be overridden to permit incoming calls having the identified portion of a telephone number. As desired, a plurality of telephone number portions may be identified, and the incoming call permissions may be overridden to permit incoming calls from any of the plurality of identified telephone number portions. Operations may then continue at block 440.

At block 440, a determination may be made as to whether location information and/or geographical information associated with a location of the user device, such as GPS coordinates, is available. If it is determined at block 440 that location information is not available, then operations may end. If, however, it is determined at block 440 that location information is available, then operations may continue at block 445. At block 445, a determination may be made as to whether a geographical or location-based override to the incoming call permissions should be performed and/or is authorized. If it is determined at block 445 that a location-based override is not authorized or directed, then operations may end. If however, it is determined at block 445 that a location-based override should be performed, then operations may continue at block 450.

At block 450, location information associated with the user device, such as GPS coordinates associated with the user device, may be identified or determined. For example, location information included in a call connection request may be identified. Operations may then continue at block 455, and corresponding location information associated with or potentially associated with one or more emergency systems may be identified and/or determined. A wide variety of suitable methods may be utilized as desired to identify location information associated with emergency systems. As one example, location information associated with the user device may be mapped to one or more NPA codes and/or NPA-NXX codes in a similar manner as that described above for the telephone number-based overrides. As another example, location information associated with the user device may be utilized to establish a geographical area (e.g., a ten-mile radius, a twenty-mile radius, etc.) from which an emergency callback may originate. As desired, the determined geographical area may be mapped to GPS coordinates, NPA and/or NPA-NXX codes, ZIP codes, and/or other location information. In this regard, when a callback request is received, location information included in the callback request (e.g., a dialed-from number, a street address, GPS coordinate information, etc.) may be utilized to determine whether the callback originated from within the determined approved geographical area. As yet another example, location information associated with the user device may be utilized to access a database and/or any number of other data sources associated with available emergency systems. In this regard, telephone numbers and/or portions of telephone numbers associated with emergency systems having a location proximate to the location of the user device may be identified. These telephone numbers may be temporarily or permanently allowed to a white list or approved list for incoming calls to the user device.

Once corresponding location information associated with one or more emergency systems has been identified at block 455, operations may continue at block 460. At block 460, the incoming call permissions associated with the user profile or user account may be overridden to permit incoming calls having location information that matches the determined corresponding location information and/or that satisfies any number of corresponding location information parameters. Operations may then end.

The method 400 may end following either block 440, 445, or 460.

The operations described and shown in the methods 300, 400 of FIGS. 3-4 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3-4 may be performed.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for facilitating an emergency callback, the method comprising:
    receiving, by a call processing system comprising one or more computers, a request to permit the connection of a telephone call originated by a user device;
    identifying, by the call processing system, the telephone call as an emergency call; and
    overriding, by the call processing system based upon the identification, one or more incoming call parameters to permit connection of a return call to the user device, wherein overriding one or more incoming call parameters comprises at least overriding one or more incoming call parameters to permit a predetermined number of incoming calls, wherein overriding one or more incoming call parameters comprises:
        identifying, by the call processing system, geographical information associated with the user device;
        determining, by the call processing system based at least in part upon the identified geographical information, corresponding location information for one or more emergency systems; and
        overriding the one or more incoming call parameters to permit an incoming call associated with the determined location information.

2. The method of claim 1, wherein overriding one or more incoming call parameters further comprises:

determining, by the call processing system, an identifier associated with the user device;

accessing, by the call processing system utilizing the identifier, stored user profile information associated with incoming call permissions; and overriding at least a portion of the accessed user profile information.

3. The method of claim 1, wherein overriding one or more incoming call parameters further comprises overriding one or more incoming call parameters to permit one or more incoming calls for a predetermined period of time.

4. The method of claim 1, further comprising:

permitting, by the call processing system based upon identifying the telephone call as an emergency call, connection of the telephone call.

5. The method of claim 1, further comprising:

receiving, by the call processing system, a request to permit the connection of the return call; and determining, by the call processing system based upon an analysis of the overridden one or more incoming call parameters, that the return call is permitted to be connected.

6. A system for facilitating an emergency callback, the system comprising:

at least one communications interface configured to receive a request to permit the connection of a telephone call originated by a user device; and at least one processor configured to (i) identify the telephone call as an emergency call and (ii) override, based upon the identification, one or more incoming call parameters to permit connection of a return call to the user device, wherein the one or more incoming call parameters are overridden to permit at least a predetermined number of incoming calls, wherein, the at least one processor is further configured to (i) identify geographical information associated with the user device, (ii) determine, based at least in part upon the identified geographical information, corresponding location information for one or more emergency systems, and (iii) override the one or more incoming call parameters to permit an incoming call associated with the determined location information.

7. The system of claim 6, wherein the at least one processor is further configured to (i) determine an identifier associated with the user device, (ii) access, utilizing the identifier, stored user profile information associated with incoming call permissions, and (iii) override the one or more incoming call parameters by overriding at least a portion of the accessed user profile information.

8. The system of claim 6, wherein the one or more incoming call parameters are overridden to further permit one or more incoming calls for a predetermined period of time.

9. The system of claim 6, wherein the at least one processor is further configured to (i) determine, based upon the identification of the telephone call as an emergency call, that the telephone call is permitted and (ii) direct the at least one communications interface to communicate a permission instruction for the telephone call.

10. The system of claim 6, wherein:

the at least one communications interface is further configured to receive a request to permit the connection of the return call, and the at least one processor is further configured to (i) determine, based upon an analysis of the overridden one or more incoming call parameters, that the return call is permitted to be connected and (ii) direct the at least one communications interface to communicate a permission instruction for the return call.

11. A method for facilitating an emergency callback, the method comprising:

receiving, by a call processing system comprising one or more computers, a request to permit the connection of a telephone call;

identifying, by the call processing system, the telephone call as an emergency call;

overriding, by the call processing system based upon the identification, one or more permission parameters for a user, the one or more permission parameters associated with the receipt of incoming calls made to the user, wherein overriding one or more incoming call parameters comprises:

identifying, by the call processing system, geographical information associated with the user device;

determining, by the call processing system based at least in part upon the identified geographical information, corresponding location information for one or more emergency systems; and overriding the one or more incoming call parameters to permit an incoming call associated with the determined location information;

receiving, by the call processing system, a request to permit the connection of a return emergency call; and permitting, by the call processing system based upon an analysis of the overridden one or more permission parameters, a connection of the return emergency call, wherein overriding the one or more permission parameters comprises permitting at least the connection of a predetermined number of incoming calls.

\* \* \* \* \*